United States Patent
Raghunath et al.

(10) Patent No.: US 8,847,962 B2
(45) Date of Patent: Sep. 30, 2014

(54) EXCEPTION PROCESSING OF CHARACTER ENTRY SEQUENCES

(75) Inventors: Mandayam T. Raghunath, Bangalore (IN); Balaji Gopalan, Chennai (IN)

(73) Assignee: Google Inc., Mountain View, CA (US)

( * ) Notice: Subject to any disclaimer, the term of this patent is extended or adjusted under 35 U.S.C. 154(b) by 1005 days.

(21) Appl. No.: 12/166,237

(22) Filed: Jul. 1, 2008

(65) Prior Publication Data
US 2010/0002004 A1    Jan. 7, 2010

(51) Int. Cl.
*G06T 11/00* (2006.01)
*G06F 17/22* (2006.01)
*G06F 17/21* (2006.01)

(52) U.S. Cl.
CPC ........ *G06F 17/2223* (2013.01); *G06F 17/2217* (2013.01); *G06F 17/214* (2013.01)
USPC ........ 345/467; 345/468; 345/469; 345/469.1; 382/182; 382/187; 715/703; 715/780; 704/8

(58) Field of Classification Search
CPC ....... G06T 11/203; G09G 5/24; G06F 17/214
USPC .................. 345/157, 467–469; 382/182–187; 704/8; 715/703, 780
See application file for complete search history.

(56) References Cited

U.S. PATENT DOCUMENTS

| | | | |
|---|---|---|---|
| 6,934,564 B2 * | 8/2005 | Laukkanen et al. | 455/566 |
| 7,801,722 B2 * | 9/2010 | Kotipalli et al. | 704/8 |
| 2003/0119551 A1 * | 6/2003 | Laukkanen et al. | 455/556 |
| 2005/0195171 A1 * | 9/2005 | Aoki et al. | 345/172 |
| 2006/0126936 A1 * | 6/2006 | Bhaskarabhatla | 382/187 |
| 2007/0156394 A1 | 7/2007 | Banerjee et al. | |
| 2007/0174771 A1 * | 7/2007 | Mistry | 715/703 |
| 2007/0276650 A1 * | 11/2007 | Kotipalli et al. | 704/8 |
| 2007/0277118 A1 * | 11/2007 | Kotipalli et al. | 715/780 |
| 2008/0120541 A1 | 5/2008 | Cheng | |
| 2008/0186211 A1 * | 8/2008 | Harman | 341/22 |
| 2008/0221866 A1 * | 9/2008 | Katragadda et al. | 704/8 |
| 2008/0240567 A1 * | 10/2008 | Chaoweeraprasit et al. | 382/182 |
| 2009/0037837 A1 * | 2/2009 | Raghunath et al. | 715/773 |

* cited by examiner

*Primary Examiner* — Jin-Cheng Wang
(74) *Attorney, Agent, or Firm* — Fish & Richardson P.C.

(57) ABSTRACT

Systems and techniques are described to perform operations including displaying a first character in a user interface in response to a first user input, the first character encoded by a first ordered sequence comprising at least one code point, receiving a second user input, determining if the second user input defines an exception input to the first ordered sequence, in response to determining that the second user input defines an exception input to the first ordered sequence, generating a second ordered sequence comprising at least one code point, the second ordered sequence based on the first ordered sequence and the exception input, wherein the second ordered sequence does not include the first ordered sequence in a predicate sequence, and displaying a second character defined by the second ordered sequence in place of the first character in the user interface.

35 Claims, 9 Drawing Sheets

EXCEPTION PROCESSING OF CHARACTER ENTRY SEQUENCES

TECHNICAL FIELD

This disclosure relates to entering characters of a writing system into a user interface.

BACKGROUND

Computer software, for example, text editors, enable users to enter characters of a writing system, such as the Roman characters used, in writing text in a language, e.g., English, using input devices, e.g., keyboards, and in response, display the entered characters in a display device. In many writing systems, sequences of characters form words. For example, in writing English, sequences are formed by arranging characters including consonants and vowels adjacent to each other. A consonant or vowel that forms the first letter of a word is a first letter sequence of the word. When a second letter is added to the first letter, the combination of the first letter and the second letter forms a second sequence, and the first sequence is a subsequence (and more specifically, a prefix) of the second sequence. A third sequence is formed when a third letter is added to the second sequence, and so on.

Such letter sequences can be encoded by numerical values and stored in a computer memory. The most prevalent encoding system is Unicode, which provides a unique number for every character. The Unicode system readily facilitates text entry of many Western-style languages in which words are formed by sequential entry of characters. Typically, entry of the letters in a Unicode input sequence corresponds to the phonetic sound of the word. However, in certain languages, there are characters that, when entered, results in a particular sequence that does not conform to a corresponding writing sequence that a native speaker would use when writing the characters on paper. Indic languages, for example, include consonants, vowels, and combinations of them whose Unicode input sequences do not conform to their writing sequences. Thus, users that are fluent in such languages often must input Unicode characters in a sequence that is different than would be used when writing without the aid of computer device, e.g., when using pen and paper.

For example, Indic characters include symbols representing consonants, vowels, and dependent markers that also represent vowels and other variations. A common combination is a consonant and a vowel. In the Indic language, rather than writing a character for the consonant immediately followed by a character for the vowel, a single character of the consonant and a dependent vowel marker representing the vowel is written. There is, however, no Unicode input sequence that corresponds to how a fluent writer would actually write the single character that is the combination of the consonant and a dependent vowel marker. Thus, in using conventional text input software, the fluent writer typically must input a Unicode sequence for certain characters that corresponds to a sequence of characters that the fluent writer would not otherwise use when writing.

SUMMARY

This specification describes technologies relating to managing exceptions to character entry sequences.

In general, one aspect of the subject matter described in this specification can be embodied in methods that include the actions of displaying a first character in a user interface in response to a first user input, the first character encoded by a first ordered sequence comprising at least one code point; receiving a second user input; determining if the second user input defines an exception input to the first ordered sequence; in response to determining that the second user input defines an exception input to the first ordered sequence, generating a second ordered sequence comprising at least one code point, the second ordered sequence based on the first ordered sequence and the exception input, wherein the second ordered sequence does not include the first ordered sequence in a predicate sequence; and displaying a second character defined by the second ordered sequence in place of the first character in the user interface. Other embodiments of this aspect include corresponding systems, apparatus, and computer program products.

In another aspect, a computer-implemented method is described. The method includes receiving a first sequence including at least one character in a user interface. The first sequence is received in response to a first user input. The at least one character is encoded by a first ordered sequence including multiple first code points. The method includes receiving a second sequence including multiple second code points. Further, the method includes determining that the second sequence defines an exception to the first ordered sequence, and in response, generating a third sequence that is based on the first sequence and the second sequence. The third sequence includes multiple third code points that includes the multiple first code points and the multiple second code points. Furthermore, the method includes displaying an output defined by the third sequence in place of the first sequence and the second sequence.

This, and other aspects, can include the following feature. A sequence in which code points in the multiple third code points are arranged does not comprise the multiple first code points in the first sequence followed by the multiple second code points in the second sequence. Other embodiments of this aspect include corresponding systems, apparatus, and computer program products.

Particular implementations of the subject matter described in this disclosure can be implemented to realize one or more of the following advantages. The methods and techniques described enable users to enter characters of a language in a sequence that comports with the rules of the language, e.g., the sequence in which the user typically writes the language. The methods and techniques identify exception inputs in an input sequence that are an exception to a representative predefined sequence, and alters the entered sequence to produce a desired output.

The details of one or more implementations of the disclosure are set forth in the accompanying drawings and the description below. Other features, aspects, and advantages will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
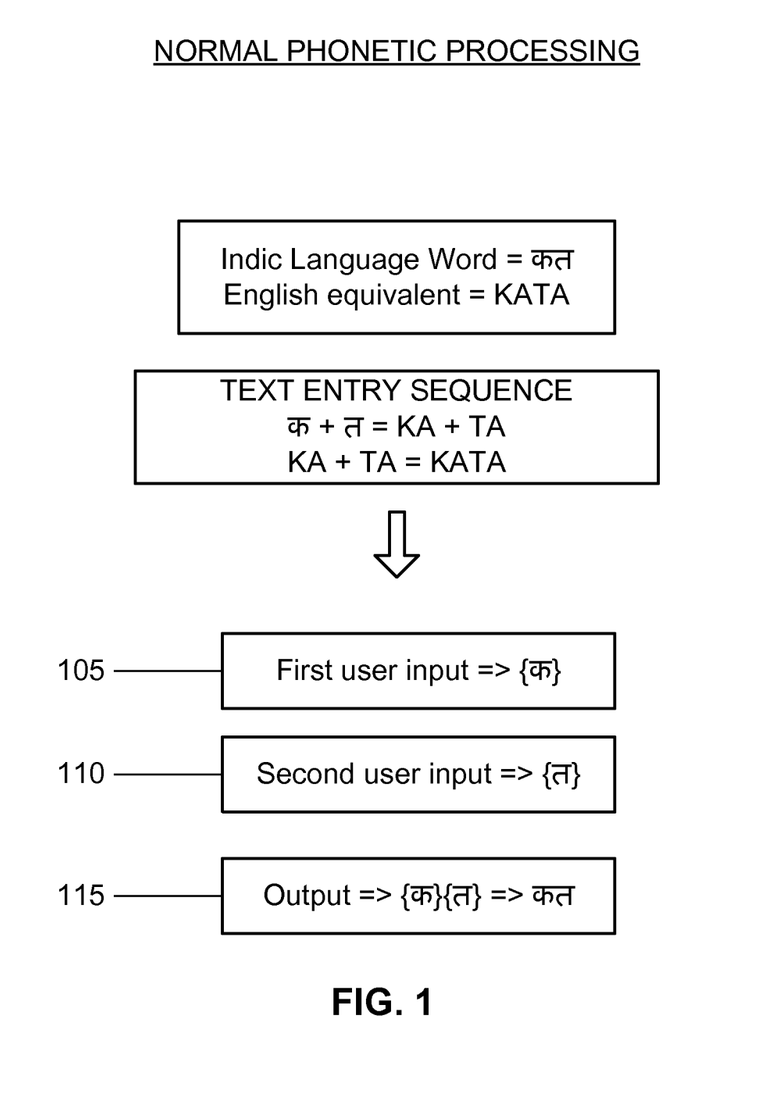
FIG. 1 is an example of a sequence of character inputs forming a Hindi word by normal phonetic processing.

FIG. 1 is an example of a sequence of character inputs forming a Hindi word by normal phonetic processing by a Unicode device. Normal phonetic process occurs when each Unicode code point corresponding to an input generates an input character that is also an output character, so that the output sequence contains an output character corresponding to each input in the input sequence.

The example of FIG. 1 depicts normal phonetic processing of a sequence of character inputs forming a Hindi character sequence "कत", which has the phonetic sound of "kata". The selected character sequence is not a word in Hindi, and is selected as an example to illustrate implementations of methods and systems described herein. It is to be understood that the methods described herein can be applied to any character sequence, regardless of whether the sequence forms an official Hindi word or not. The first character in the word is the consonant "क" which has the phonetic sound "ka" and (Unicode) code point 0915, and the second character in the word is the consonant "त" which has the phonetic sound "ta", and code point 0924. The sequence of user inputs and outputs to display "कत" is shown in Table 1.

TABLE 1

| Input | Character | Code point | Output (115) | Code points in output sequence |
|---|---|---|---|---|
| First input (105) -क | First character -क | 0915 | कत | 0915, 0924 |
| Second input (110) -त | Second character -त | 0924 | | |

On a user device that enables users to input characters, for example, a computer system, the first character "क" is displayed in response to receiving a first user input, i.e., a selection of the character "क" on a keyboard. The first character "क" is thus encoded by a first ordered sequence of code points that includes the code point for "क". Subsequently, the second input, i.e., a selection of the character "त" on the keyboard, is received. In response, a code point corresponding to "त" is identified, the first ordered sequence is updated with this code point, and the output "कत" is displayed in the user interface. The output "कत" is encoded by the first ordered sequence including the code point for "क", and the code point for "त". In normal phonetic processing, each subsequence of an ordered sequence represents a predicate sequence. In some implementations, the predicate sequence is a sequence that is recognized by Unicode. For example, characters can be input into a user interface in a recognizable sequence such that the characters are combined to form an output. In such scenarios, the sequence represents a predicate sequence.

In this particular case, the phonetic sequence in normal phonetic processing also corresponds to a sequence of characters in which a fluent writer of Hindi will write the characters on paper.

Figure 2:
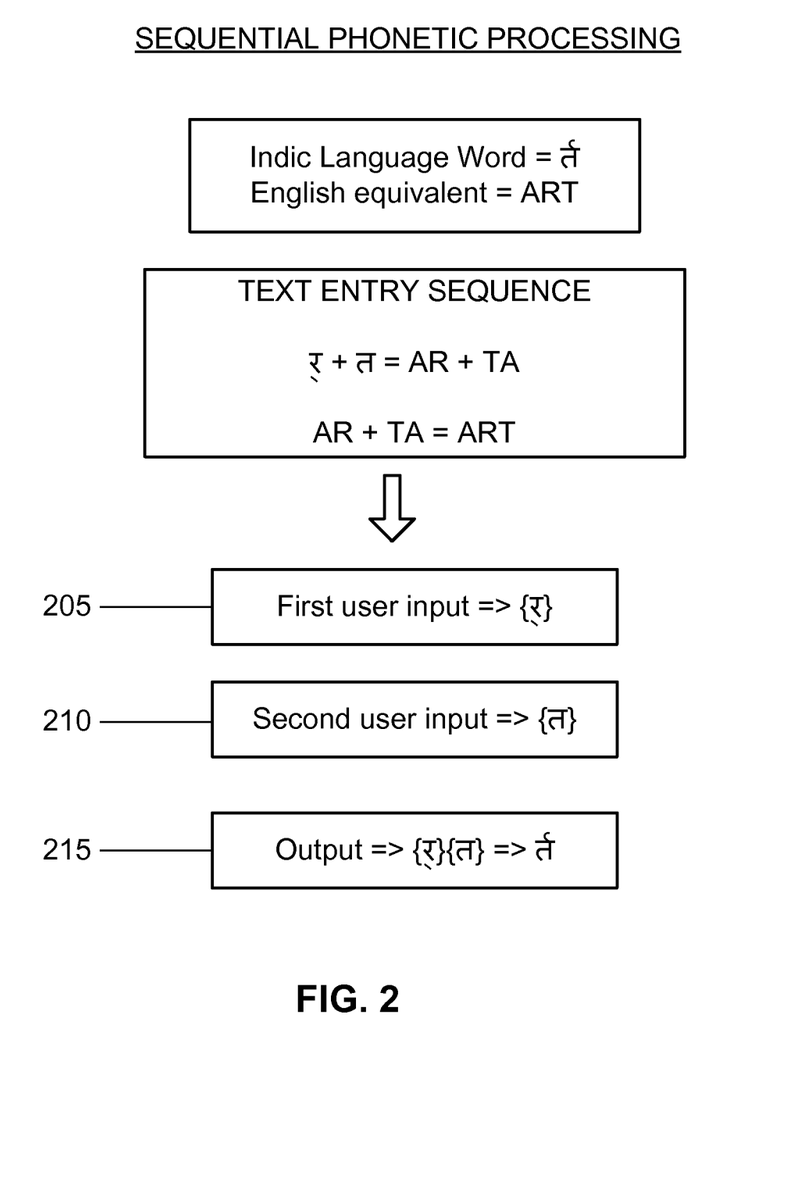
FIG. 2 is an example of a sequence of inputs forming a Hindi character by sequential phonetic processing.

FIG. 2 is an example of a sequence of inputs forming a Hindi character by sequential phonetic processing in a Unicode device. Sequential phonetic processing is similar to normal phonetic processing in that a Unicode sequence of input characters corresponds to the phonetic sound of a component part of a word. However, in sequential phonetic processing, each Unicode code point corresponding to an input generates an input character, but not all of the input characters are output characters. Thus, the output sequence contains an output character that is not one of the input characters.

The output character illustrated in the example in FIG. 2 is "तॅ", which sounds like "art", and is a variant of the consonant "त" formed by combining the consonant "त" with a dependent marker illustrated by the arch symbol placed over the consonant "त". The arch symbol represents the sound "ar" and the consonant "त" represents the sound "ta". The combination is represented as "तॅ" and the sound it represents is "art".

In sequential phonetic processing, the character "तॅ" is formed by receiving Hindi characters in a writing sequence that corresponds to the phonetic sequence. This sequence is formed by receiving the Hindi character "र", which corresponds to the sound "ar", followed by receiving the Hindi character "त", which corresponds to the sound "ta", so that the phonetic sound "art" is produced by the combination of "ar" and "ta". The sequence of user inputs and outputs to display "तॅ" in sequential phonetic processing is shown in Table 2.

TABLE 2

| Input | Character | Code point | Output (215) | Code points in output sequence |
|---|---|---|---|---|
| First input (205) -र | First character -र | 0930, 094D | तॅ | 0930, 094D, 0924 |
| Second input (210) -त | Second character -त | 0924 | | |

On a user device, the first character "र" is displayed in response to receiving the first user input 205, i.e., a selection of the character "र" on a keyboard. Because the character "र" is a variant of the consonant "र", in some implementations, the character "र" can be input by two user inputs, the first being a selection of the character "र" and the second being a selection of the halant sign (्) that, in combination with "र" produces the character "र". Such selections result in the input of a first order sequence of code points 0930 and 094D, values that correspond to the character "र" and the halant sign, respectively.

Subsequently, the second input 210, which is the selection of the character "त" on the keyboard, is received. In response, the code point 0924, corresponding to "त" is identified, and the first ordered sequence is updated. The combination of "र" and "त" form the output 215 "तॅ", which is represented by the first ordered sequence 0930, 094D, and 0924. The two characters "र" and "त" displayed in response to the inputs are replaced by "तॅ".

In the example in FIG. 2, the Unicode sequence of the inputs corresponds to the phonetic sequence. However, the Unicode sequence does not correspond to a sequence in which a fluent writer will actually write "तॅ" (the fluent writer will not write characters "र" and "त" on paper because these two characters will not produce "तॅ"). Instead, the fluent writer may first write "त", and then add the arch symbol above "त". Accordingly, many fluent writers of the Indic language may find the process of entering Indic text on a Unicode device to be awkward or non-intuitive.

Thus, in some implementations, a pre-phonetic exception input to the sequential phonetic processing of Unicode can be used to facilitate the entering characters in a more intuitive manner, e.g., entering inputs that do not correspond to the order of the phonetic sounds that are represented by the inputs.

In the case of "तॅ", the entry of dependent marker, i.e., the arch symbol, can be characterized as a pre-phonetic exception input because when "तॅ" is spoken, the sound produced by the arch symbol occurs before the sound produced by the consonant to which the arch symbol is added, despite the fact that the consonant is entered as input before the arch symbol is entered as input.

Figure 3:
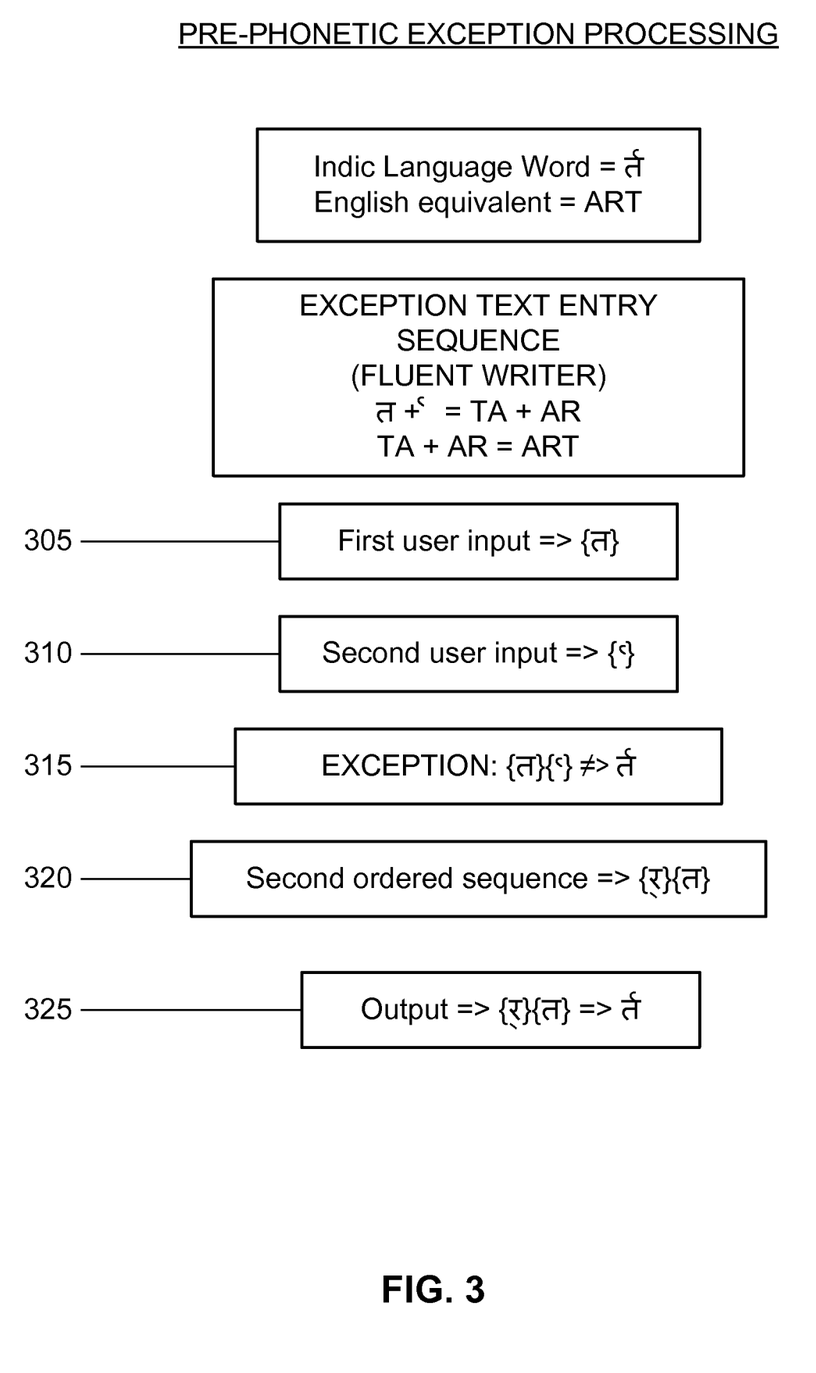
FIG. 3 is an example of a first exception input to a sequence of inputs forming a Hindi character by pre-phonetic exception input processing.

FIG. 3 is an example of a first exception input to a sequence of inputs forming a Hindi character by pre-phonetic exception input processing. The output Hindi character illustrated in FIG. 3 is the same as the output Hindi character illustrated in FIG. 2. As shown in FIG. 3, the input sequence to form "तॅ" is "त" followed by a symbol indicative of the arch symbol. In Unicode, the arch symbol does not have a unique code point; thus, in some implementations, the arch symbol can be represented on an input device, e.g., a keyboard, by any Hindi character having the arch symbol displayed over the character, such as "कॅ". The choice of Hindi character over which the arch symbol is displayed is arbitrary and the character can be any character so long as the representation conveys that the arch symbol will be selected upon selection of the displayed character. In some implementations, the display can include any illustration including the arch symbol or the display can include only the arch symbol and no character or illustrations. In some implementations, the Hindi character over which the arch symbol is displayed can be dynamically re-written. For example, the most recent character entered using the input device can be identified by determining the character to the left of the cursor position in the user interface. The arch symbol can be displayed over the identified character and provided for selection. When a new character is entered, the previously identified character is dynamically replaced with the new character. The sequence of inputs in the pre-phonetic exception processing to form the output "तॅ" is shown in Table 3.

TABLE 3

| Input | Character | Code point | Output (325) | Code points in output sequence |
|---|---|---|---|---|
| First input (305) -त | First character -त | 0924 | तॅ | 0930, 094D, 0924 |
| Second input (310) -कॅ | Exception input (315) | 0930, 094D | | |

The first character "त" is displayed in a user interface in response to receiving a first user input, e.g., a selection of the character "त" on a keyboard. In this example, the first character is encoded by a first ordered sequence that includes the code point for "त", which is 0924. Subsequently, the second input, i.e., the selection of the arch symbol, e.g., caused by the selection of the key "कॅ", is received. The second user input, "कॅ", defines an exception input to the first ordered sequence because the code point 0924 and the code point of the second user input, when encoded, do not form the desired output. That is, the code points of the sequence 0924, 0930, and 094D do not represent the character "तॅ".

To handle this pre-phonetic exception input, a second ordered sequence is generated based on the first ordered sequence. The second ordered sequence includes the code point for "त" and at least one or more code points representing the arch symbol. The code points in the second ordered sequence do not include the code point of "त" in a predicate sequence. Although "त" was received as the first input, in the code points encoded in the second ordered sequence, the code point for "त" does not appear first.

For pre-phonetic exception processing, upon detecting an input of the arch symbol after the input representing "त", the position immediately preceding the character "त" is identified, and the character "र" is inserted. The combination of "र" and "त" represents the input sequence to form the output "तॅ" in subsequent phonetic processing. Subsequently, the output 325 "तॅ" is displayed in the user interface. The code point for "र", of which "र्" is a variant, appears first in the second ordered sequence followed by the code point for "त".

In summary, pre-phonetic exception input processing thus allows a user to enter a consonant first, followed by accent symbol that is representative of a phonetic sound to the sound associated with the consonant. Accordingly, a user may enter text inputs in an order that is more intuitive than the sequential phonetic input order required by Unicode. In such processing, the code points corresponding to the accent symbol are inserted into the output sequence before the code points corresponding to the first input.

Figure 4:
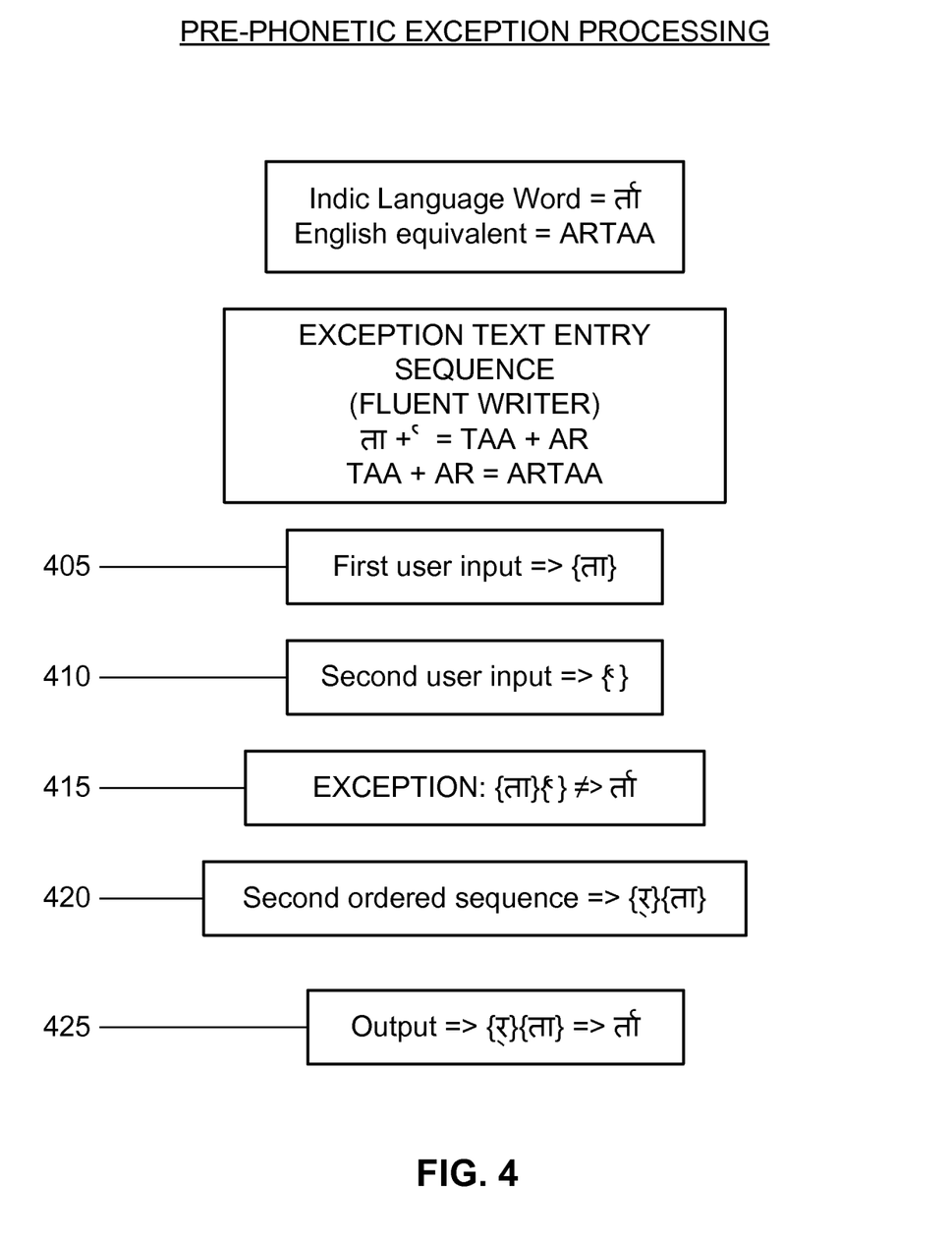
FIG. 4 is another example of a first exception input to a sequence of inputs forming a Hindi character by pre-phonetic exception input processing.

FIG. 4 is another example of a first exception input to a sequence of inputs forming a Hindi character by pre-phonetic exception input processing. One of the characters in the text entry sequence includes a combination of the consonant "त" and a dependent vowel marker representing the vowel "आ", which sounds like "aa", to form the character "ता", which sounds like "taa". To generate the desired output of "तॅा" "The arch symbol is received in a user interface after the character "ता" is received. The sequence of inputs in the pre-phonetic exception processing to form the output "तॅा" is shown in Table 4.

TABLE 4

| Input | Character | Code point | Output (425) | Code points in output sequence |
|---|---|---|---|---|
| First input (405) -ता | First character - ता | 0924, 093E | तॅा | 0930, 094D, 0924, 093E |
| Second input (410) -कॅ | Exception input (415) | 0930, 094D | | |

As shown in FIG. 4, the input sequence of code point including inputs of 0924 and 093E followed by 0930 and 094D constitute an exception input that results in the output sequence of 0930, 094D, 0924, and 093E.

Figure 5:
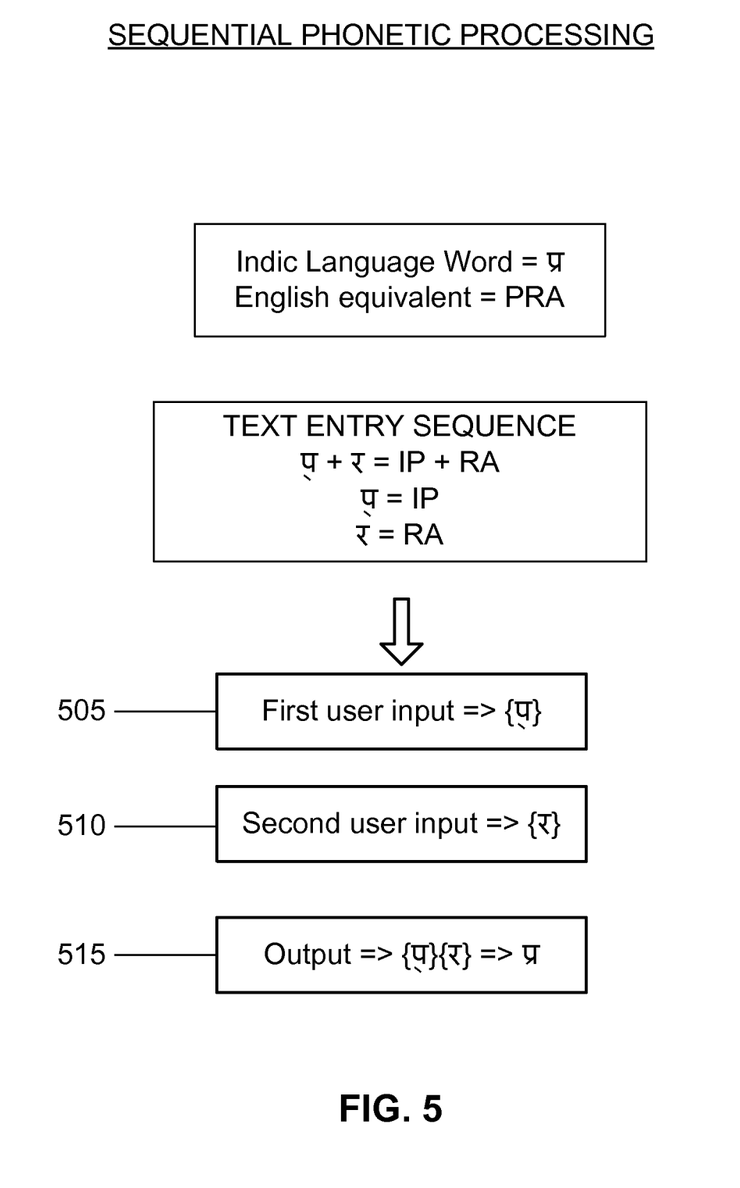
FIG. 5 is an example of a sequence of inputs forming a Hindi character by sequential phonetic processing.

FIG. 5 is an example of a sequence of inputs forming a Hindi character by sequential phonetic processing. The example of a sequence of inputs forming a Hindi character "प्र" (phonetic sound "pra") that is a variant of the consonant "प" formed by combining a dependent marker illustrated by the inclined line that represents the sound "ra" with "प" such that the combination is represented as "प्र". In sequential phonetic processing, the character "प्र" can be formed by receiving Hindi characters in a writing sequence that corresponds to a phonetic sequence when "प्र" is spoken. The sequence of user inputs and outputs to display "प्र" is shown in Table 5.

TABLE 5

| Input | Character | Code point | Output (515) | Code points in output sequence |
|---|---|---|---|---|
| First input (505) -प् | First character - प् | 092A, 094D | प्र | 092A, 094D, 0930 |
| Second input (510) -र | Second character - र | 0930 | | |

In Table 5, the first character "प्" is displayed in response to receiving a first user input 405, i.e., a selection of the character "प्" on a keyboard. In some implementations, the character "प्" can be provided for selection, while in other implementation, selecting the character "प्" as input can include the selection of the character "प" and a marker that, in combination with "प" produces the character "प्". In this example, the first character "प्" is encoded by a first ordered sequence comprising the code point for "प्" (092A, 094D). Subsequently, the second input 510, i.e., a selection of the character "र" is received. In response, a code point corresponding to "र" (0930) is identified. The preferred phonetic processing in Unicode generates the output 510 "प्र" from the combination of "प्" and "र".

Figure 6:
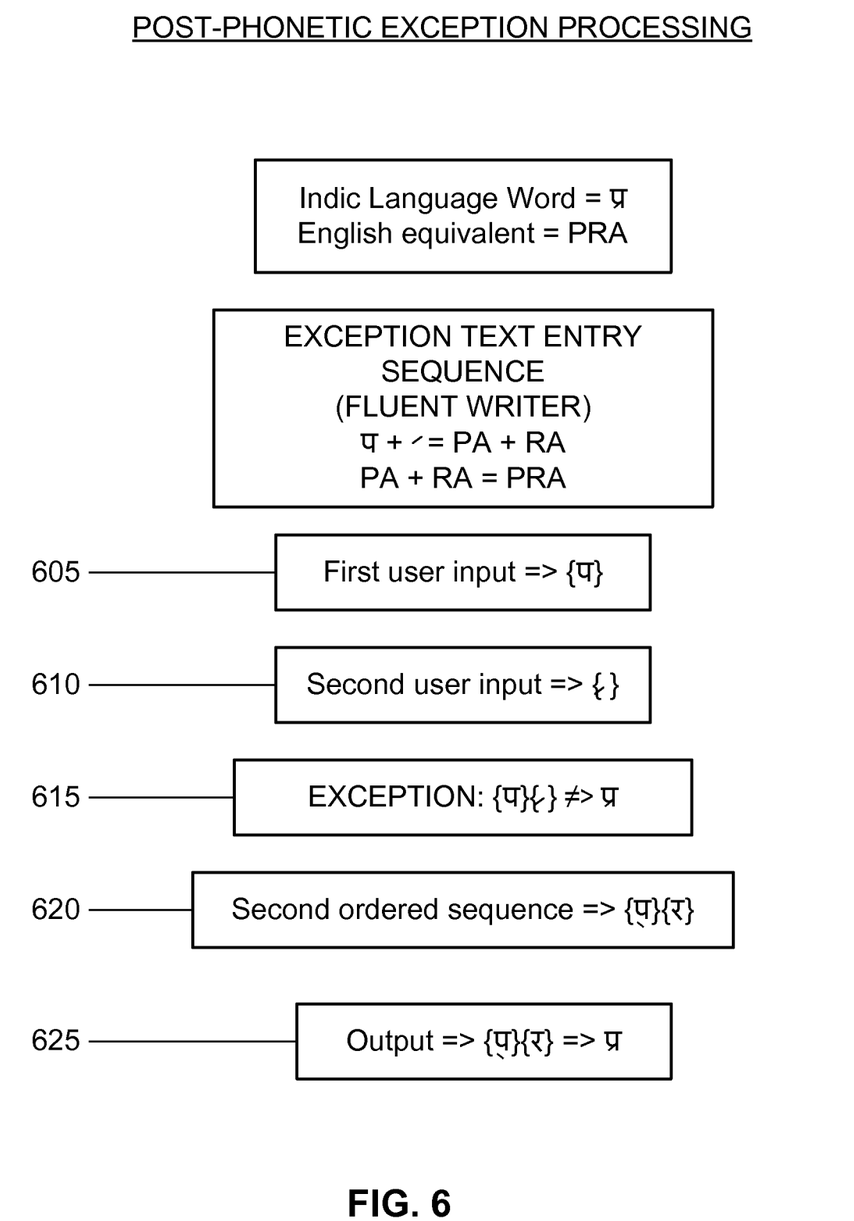
FIG. 6 is an example of a second exception input to a sequence of inputs forming a Hindi character by post-phonetic exception input processing.

FIG. 6 is an example of a second exception input to a sequence of inputs forming a Hindi character by post-phonetic exception input processing. The output Hindi character illustrated in FIG. 6 is the same as the output Hindi character illustrated in FIG. 5. A fluent writer will first write "प", and then add the inclined line symbol adjacent to the left of "प" to form the character "प्र". Thus, the input of the inclined line symbol after the input of the character "प" represents a post-phonetic exception input because the corresponding code points that are input form an input sequence that is different than the output sequence. The sequence of user inputs, including the exception input, and the output "प्र" is shown in Table 6.

TABLE 6

| Input | Character | Code point | Output (625) | Code points in output sequence |
|---|---|---|---|---|
| First input (605) -प | First character - प | 092A | प्र | 092A, 094D, 0930 |
| Second input (610) -क्र | Exception input (615) | 094D, 0930 | | |

The first character "प" is displayed in a user interface in response to receiving a first user input 605, e.g., a selection of the character "प" on a keyboard, and is encoded by a first ordered sequence that includes a code point for "प" (092A). Subsequently, the second input 610, i.e., the selection of the inclined line symbol by selection of the key "क्र" is received. The inclined line symbol is an exception input 615 to the sequential phonetic processing sequence. In response, the code points of the ordered sequence 092A, 094D and 0930 result in the code points 092A, 094D, and 0930, which, in turn, causes the character "प्र" to be displayed in the user interface. In this example, a difference between the output sequence and the input sequence is that in the input sequence, a code point of the halant symbol (094D) is associated with the character "प" whereas in the output sequence, the code point associated of the halant symbol is not associated with that character.

Figure 7:
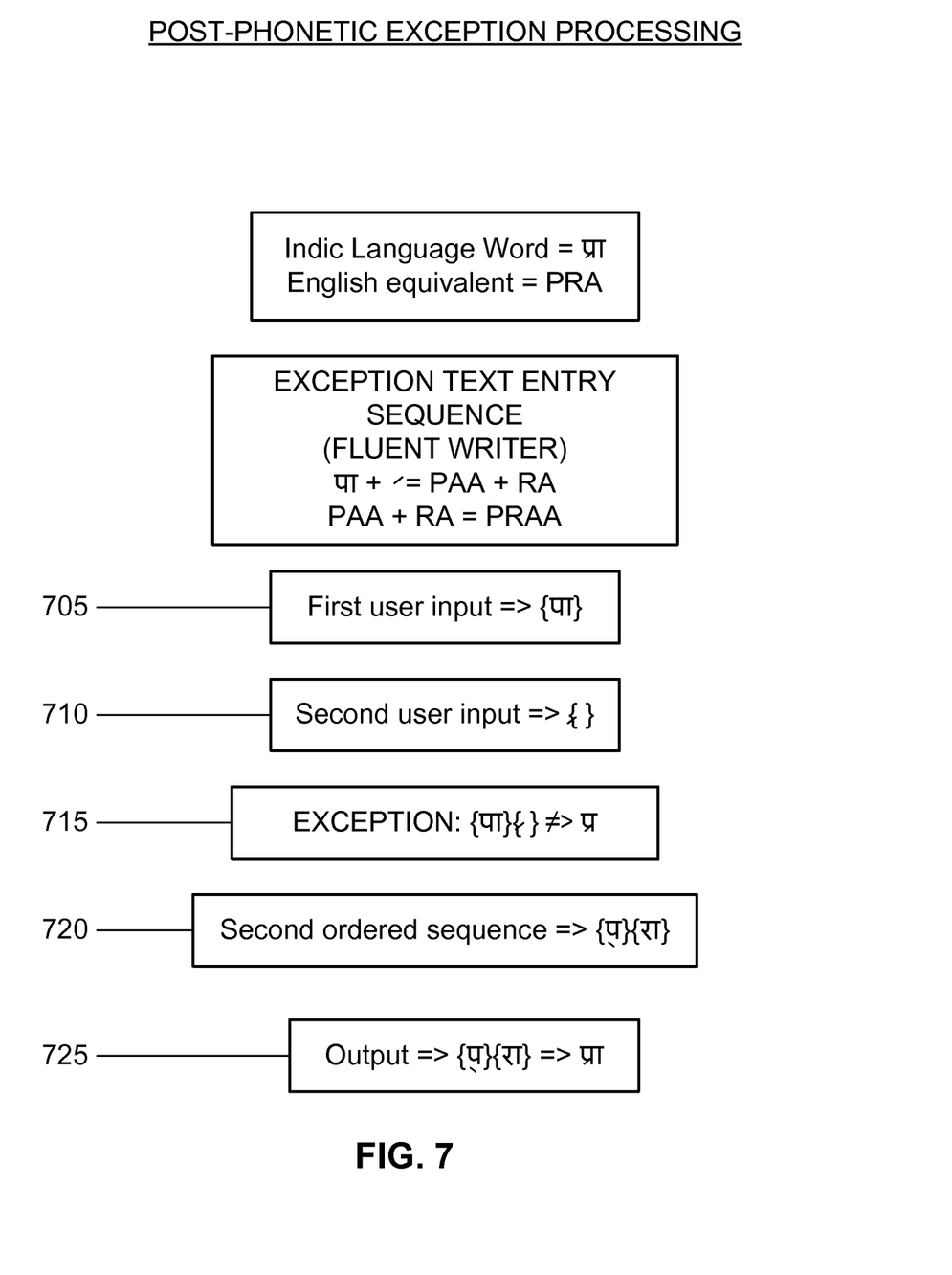
FIG. 7 is another example of a second exception input to a sequence of inputs forming a Hindi character by post-phonetic exception input processing.

FIG. 7 is another example of a second exception input to a sequence of inputs forming a Hindi character by post-phonetic exception input processing. The output character "प्रा" includes a dependent vowel marker. The sequence of user inputs, including the exception input, and the output "प्रा" is shown in Table 7. Note that although the sequence in which the code points are received is 092A, 093E (first input) followed by 094D, 0930 (second input), the code points associated with the second input are inserted between the code points associated with the first input resulting in 092A, 094D, 0930, 093E as the output code point sequence.

TABLE 7

| Input | Character | Code point | Output (725) | Code points in output |
|---|---|---|---|---|
| First input (705) -पा | First character -पा | 092A, 093E | प्रा | 092A, 094D, 0930, 093E |
| Second input (710) क्र | Exception input (715) | 094D, 0930 | | |

Exception can be realized by instructions that upon execution cause a processing device to carry out the processes and functions described above. Such instructions can, for example, include interpreted instructions, such as script instructions, e.g., JavaScript or ECMAScript instructions, or executable code, or other instructions stored in a computer readable medium. In some implementations, a look-up table of code point sequences of first ordered sequences for pre-phonetic and post-phonetic exception inputs can be mapped to corresponding second ordered sequences. For example, first ordered sequence of 092A, 093E, 0915, 094D and 0930 can be mapped to the second ordered sequence of 092A, 094D, 0930, and 093E. In other implementations, an input sequence of first characters can be mapped to an output sequence of second characters. For example, the input sequence of characters पा and क्र can be mapped to the output character प्रा. Combinations of character mappings and code point sequences can also be used.

Figure 8:
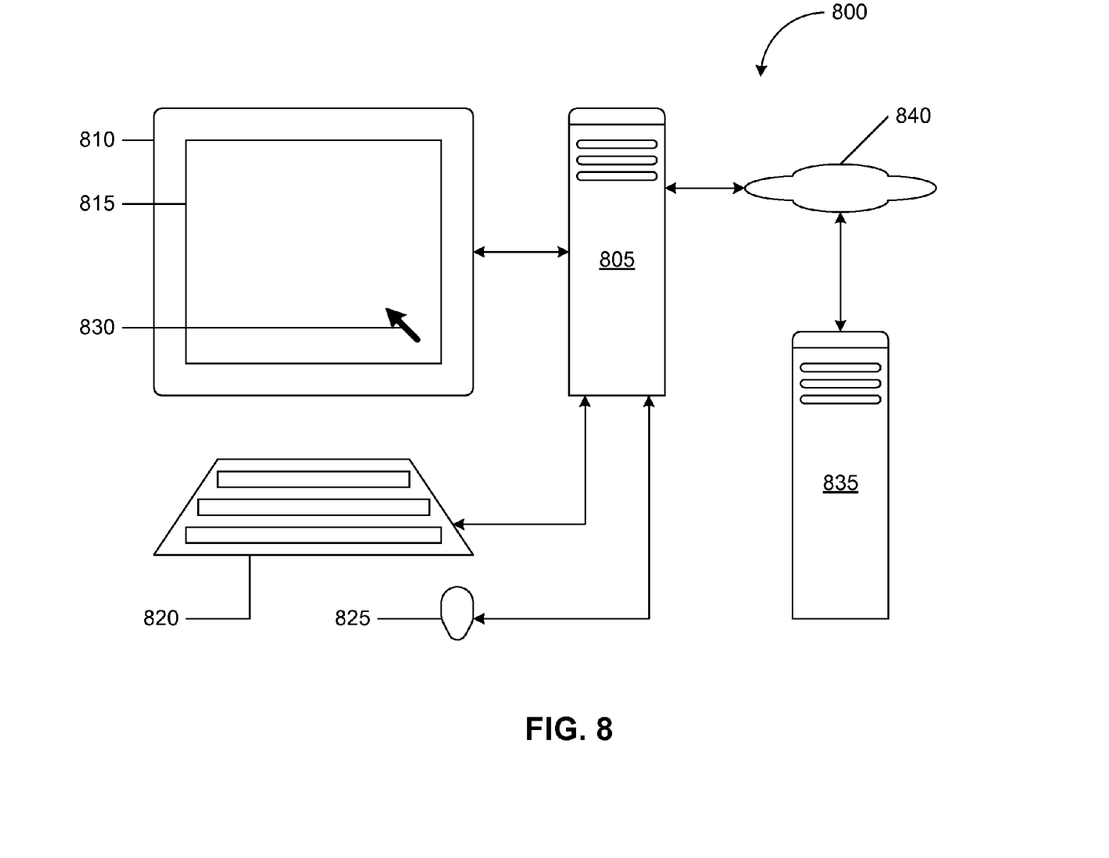
FIG. 8 is an example of a system to enter Hindi characters.

FIG. 8 depicts a schematic of an example of a system 800 for entering Hindi characters. The system 800 can be any computer system such as a desktop computer, laptop computer, personal digital assistant (PDA), and the like. The system 800 includes a display device 810 operatively coupled to a computer 805, where the user interface 815 is displayed in the display device 810. In addition, the system 800 includes input devices, such as a keyboard 820 and a pointing device 825, e.g., a mouse, a stylus, and the like, operatively coupled to the computer 805. A user can provide input using the keyboard 820 and the pointing device 820, and can view the outcome of the input on the display device 810.

The computer 805 can be operatively coupled to a remote engine 835 over one or more networks 840, e.g., the Internet. The software that enables a user to enter Hindi characters can be located at the remote engine 835, and can be displayed in the user interface 815 when the user accesses the remote engine 835 over the one or more networks 840. In some implementations, the user can download the software on to the computer 805 to execute the software.

In some implementations, the computer 805 is configured to receive a computer readable medium, e.g., a CD-ROM, on which a computer program product including instructions to perform operations, is tangibly embodied. For example, the computer 805 can include a CD-ROM drive to receive the CD, which is, e.g., an installation disk that includes instructions corresponding to the software application that enables entering Hindi characters. The instructions in the computer program product cause the processing unit 110 to provide a user with a user interface 815 that allows the user to enter and edit Hindi characters.

Figure 9:
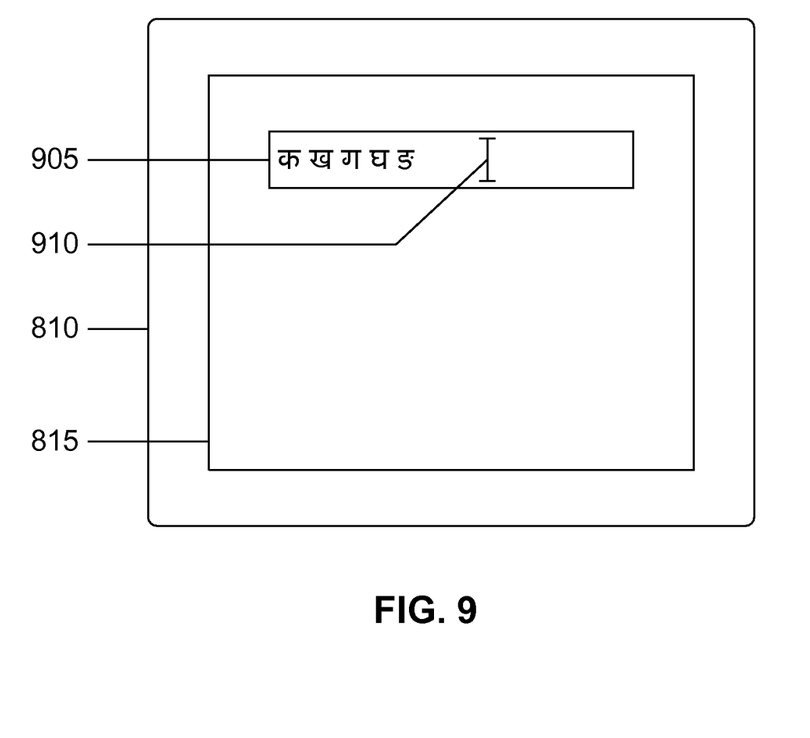
FIG. 9 is an example of a user interface in which Hindi characters are displayed.

FIG. 9 is an example of a user interface in which Hindi characters are displayed. The user interface 815 is displayed in the display device 810 and can be, e.g., a user interface provided by a web browser, a user interface provided by any software application, and the like. The user interface 815 includes a text box 905 in which a user can position the cursor 830 and select the text box 905. In response, the cursor 930 can be replaced by a vertical line 910 representing the cursor 830, where the line is similar to a line representing the cursor in a text editor, e.g., Microsoft® NotePad. The user can enter Hindi characters using the input devices 820 and 825, and the entered characters are displayed in the text box 905. In some implementations, the user interface can be a text editor.

In some implementations, the keyboard used to input Hindi characters can be a virtual keyboard displayed in a user interface and can include multiple keys representing the characters of Hindi. Examples of such keyboards are described in the patent application titled "Language Keyboard", application Ser. No. 11/833,901, filed Aug. 3, 2007, the entire content of which is incorporated herein by reference. In some implementations, the Hindi characters including consonants, vowels, dependent vowel markers, and the like, can be included in a javascript that includes exception inputs.

Implementations of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the disclosure have been described. Other implementations are within the scope of the following claims. For example, the actions recited in the claims can be performed in a different order and still achieve desirable results. In some implementations, the Hindi character that the user inputs can be a compound formed by combining a variant of a Hindi character with another consonant. An example of a compound in Hindi is "क्ष", which sounds like "ksha". The character, "क्ष", is a combination of "क्" (phonetic sound "ik") and "ष" (phonetic sound "sha") where "क्" is a variant of the consonant "क" (phonetic sound "ka"). There are multiple ways in which a user can enter "क्ष" in a user interface including selecting a key that displays "क्ष", and entering the sequence "क्+ष", which is replaced by "क्ष". Similarly, in preferred phonetic processing, there are multiple ways to enter the first exception input, namely the arch symbol, in the user interface to form "क्षॅ", including entering the sequence "र+क्+ष" or entering the sequence "र् + क्ष". In pre-phonetic exception input processing to form "क्षी", upon detecting the first input "क्ष" followed by "कि", the entered sequence is replaced with "र् + क्ष" to display "क्षी" in the user interface.

Similarly, to form the character "क्ष", the user can enter one of the sequences "क् + ष् + र" or "क्ष् + र" to form the character "क्ष". Alternatively, the user can enter "क्ष" followed by "क्र", which is replaced with the sequence "क्ष् + र" to form the character "क्ष".

The examples described in this disclosure represent only a few Hindi characters where the sequence of inputs include an exception input. The exception inputs can be added to any Hindi consonant and to any combination including consonant and dependent vowel marker. The concept of exception inputs, and managing the entry of exception inputs can also be extended to several Indic languages, e.g., Telugu, Malayalam, and the like.

What is claimed is:

1. A computer-implemented method for generating and displaying encoded characters comprising:
displaying, by data processing apparatus, a first character in a user interface in response to a first user input, the first character encoded by a first ordered code point sequence comprising at least one first code point, wherein each code point in the first ordered code point sequence represents a respective Unicode code point;
receiving, by the data processing apparatus, a second user input after the first user input;
determining, by the data processing apparatus, that the second user input defines an exception input to the first ordered code point sequence, including:
determining that the second user input is encoded by an exception code point sequence comprising one or more exception code points, wherein each code point in the exception code point sequence represents a respective Unicode code point; and
determining that a candidate ordered code point sequence, including the first ordered code point sequence followed by the exception code point sequence, does not represent a character to which a combination of the first character and the second user input corresponds;
in response to determining that the second user input defines an exception input to the first ordered code point sequence, generating, by the data processing apparatus, a second ordered code point sequence by mapping the first ordered code point sequence and the exception code point sequence to the second ordered code point sequence, wherein the second ordered code point sequence includes the at least one first code point and the one or more exception code points, and one or more beginning code points in the beginning of the second ordered code point sequence do not represent the first character; and
displaying, by the data processing apparatus, a second character defined by the second ordered code point sequence in place of the first character in the user interface.

2. The method of claim 1, further comprising:
in response to determining that the second user input does not define an exception input to the first ordered code point sequence, identifying a code point corresponding to the second user input; and
displaying characters encoded by the first ordered code point sequence and the identified code point.

3. The method of claim 1, wherein the first ordered code point sequence represents an Indic language consonant.

4. The method of claim 3, wherein generating the second ordered code point sequence comprises:
identifying a position before a code point representing the consonant in the first ordered code point sequence; and
inserting a code point representing a special character of the Indic language corresponding to the exception input in the identified position.

5. The method of claim 3, wherein generating the second ordered code point sequence comprises:
identifying a position in the first ordered code point sequence of the code point representing the consonant;
replacing the code point representing the consonant with one or more code points representing a first variant of the consonant; and
adding one or more code points representing a special character corresponding to the exception input adjacent to the one or more code points representing the first variant.

6. The method of claim 1, wherein the first ordered code point sequence represents a consonant of an Indic language in a combination including the consonant and a dependent vowel marker associated with the consonant, and wherein the first user input causes displaying the combination of the consonant and the dependent vowel marker in the user interface.

7. The method of claim 6, wherein generating the second ordered code point sequence comprises:
identifying a position before the first ordered code point sequence; and
inserting a code point representing a special character of the Indic language corresponding to the exception input in the identified position.

8. The method of claim 6, wherein generating the second ordered code point sequence comprises:
identifying a position in the first ordered code point sequence of the code point representing the consonant;
replacing the code point representing the consonant with one or more code points representing a first variant of the consonant; and
adding one or more code points representing a special character corresponding to the exception input adjacent to the one or more code points representing the first variant and between the code point representing the consonant and the dependent vowel marker.

9. The method of claim 1, wherein the code point of the first ordered code point sequence represents a variant of one Indic language character in the Indic language in a compound formed by combining the variant with a consonant of the Indic language.

10. The method of claim 9, wherein generating the second ordered code point sequence comprises:
identifying a position before a code point representing the variant in the first ordered code point sequence; and
inserting a code point representing a special character of the Indic language corresponding to the exception input in the identified position.

11. The method of claim 9, wherein generating the second ordered code point sequence comprises:
identifying a position in the first ordered code point sequence of the code point representing the consonant;
replacing the code point representing the consonant with one or more code points representing a first variant of the consonant; and
adding one or more code points representing a special character corresponding to the exception input adjacent to the one or more code points representing the first variant and between the code point representing the variant and the consonant.

12. A non-transitory computer-readable medium storing computer program instructions executable by data processing apparatus to perform operations comprising:
    displaying a first character in a user interface in response to a first user input, the first character encoded by a first ordered code point sequence comprising at least one first code point, wherein each code point in the first ordered code point sequence represents a respective Unicode code point;
    receiving a second user input after the first user input;
    determining, by the data processing apparatus, that the second user input defines an exception input to the first ordered code point sequence, including:
        determining that the second user input is encoded by an exception Code point sequence comprising one or more exception code points, wherein each code point in the exception code point sequence represents a respective Unicode code point; and
        determining that a candidate ordered code point sequence, including the first ordered code point sequence followed by the exception code point sequence, does not represent a character to which a combination of the first character and the second user input corresponds;
    in response to determining that the second user input defines an exception input to the first ordered code point sequence, generating, by the data processing apparatus, a second ordered code point sequence by mapping the first ordered code point sequence and the exception code point sequence to the second ordered code point sequence, wherein the second ordered code point sequence includes the at least one first code point and the one or more exception code points, and one or more beginning code points in the beginning of the second ordered code point sequence do not represent the first character; and
    displaying a second character defined by the second ordered code point sequence in place of the first character in the user interface.

13. The computer-readable medium of claim 12, the operations further comprising:
    in response to determining that the second user input does not define an exception input to the first ordered code point sequence, identifying a code point corresponding to the second user input; and
    displaying characters encoded by the first ordered code point sequence and the identified code point.

14. The computer-readable medium of claim 12, wherein the first ordered code point sequence represents an Indic language consonant.

15. The computer-readable medium of claim 14, wherein generating the second ordered code point sequence comprises:
    identifying a position before a code point representing the consonant in the first ordered code point sequence; and
    inserting a code point representing a special character of the Indic language corresponding to the exception input in the identified position.

16. The computer-readable medium of claim 14, wherein generating the second ordered code point sequence comprises:
    identifying a position in the first ordered code point sequence of the code point representing the consonant;
    replacing the code point representing the consonant with one or more code points representing a first variant of the consonant; and
    adding one or more code points representing a special character corresponding to the exception input adjacent to the one or more code points representing the first variant.

17. The computer-readable medium of claim 12, wherein the first ordered code point sequence represents a consonant of an Indic language in a combination including the consonant and a dependent vowel marker associated with the consonant, and wherein the first user input causes displaying the combination of the consonant and the dependent vowel marker in the user interface.

18. The computer-readable medium of claim 17, wherein generating the second ordered code point sequence comprises:
    identifying a position before the first ordered code point sequence; and
    inserting a code point representing a special character of the Indic language corresponding to the exception input in the identified position.

19. The computer-readable medium of claim 17, wherein generating the second ordered code point sequence comprises:
    identifying a position in the first ordered code point sequence of the code point representing the consonant;
    replacing the code point representing the consonant with one or more code points representing a first variant of the consonant; and
    adding one or more code points representing a special character corresponding to the exception input adjacent to the one or more code points representing the first variant and between the code point representing the consonant and the dependent vowel marker.

20. The computer-readable medium of claim 12, wherein the code point of the first ordered code point sequence represents a variant of one Indic language character in the Indic language in a compound formed by combining the variant with a consonant of the Indic language.

21. The computer-readable medium of claim 20, wherein generating the second ordered code point sequence comprises:
    identifying a position before a code point representing the variant in the first ordered code point sequence; and
    inserting a code point representing a special character of the Indic language corresponding to the exception input in the identified position.

22. The computer-readable medium of claim 20, wherein generating the second ordered code point sequence comprises:
    identifying a position in the first ordered code point sequence of the code point representing the consonant;
    replacing the code point representing the consonant with one or more code points representing a first variant of the consonant; and
    adding one or more code points representing a special character corresponding to the exception input adjacent to the one or more code points representing the first variant and between the code point representing the variant and the consonant.

23. A system comprising:
    a processor; and
    a non-transitory computer-readable medium embodying a computer program product encoding instructions to cause the processor to perform operations comprising:

displaying a first character in a user interface in response to a first user input, the first character encoded by a first ordered code point sequence comprising at least one first code point, wherein each code point in the first ordered code point sequence represents a respective Unicode code point;

receiving a second user input after the first user input;

determining, by the data processing apparatus, that the second user input defines an exception input to the first ordered code point sequence, including:

determining that the second user input is encoded by an exception code point sequence comprising one or more exception code points, wherein each code point in the exception code point sequence represents a respective Unicode code point; and determining that a candidate ordered code point sequence, including the first ordered code point sequence followed by the exception code point sequence, does not represent a character to which a combination of the first character and the second user input corresponds;

in response to determining that the second user input defines an exception input to the first ordered code point sequence, generating, by the data processing apparatus, a second ordered code point sequence by mapping the first ordered code point sequence and the exception code point sequence to the second ordered code point sequence, wherein the second ordered code point sequence includes the at least one first code point and the one or more exception code points, and one or more beginning code points in the beginning of the second ordered code point sequence do not represent the first character; and displaying a second character defined by the second ordered code point sequence in place of the first character in the user interface.

24. The system of claim 23, the operations further comprising:

in response to determining that the second user input does not define an exception input to the first ordered code point sequence, identifying a code point corresponding to the second user input; and displaying characters encoded by the first ordered code point sequence and the identified code point.

25. The system of claim 23, wherein the first ordered code point sequence represents an Indic language consonant.

26. The system of claim 25, wherein generating the second ordered code point sequence comprises:

identifying a position before a code point representing the consonant in the first ordered code point sequence; and inserting a code point representing a special character of the Indic language corresponding to the exception input in the identified position.

27. The system of claim 25, wherein generating the second ordered code point sequence comprises:

identifying a position in the first ordered code point sequence of the code point representing the consonant;

replacing the code point representing the consonant with one or more code points representing a first variant of the consonant; and adding one or more code points representing a special character corresponding to the exception input adjacent to the one or more code points representing the first variant.

28. The system of claim 23, wherein the code point of the first ordered code point sequence represents a consonant of an Indic language in a combination including the consonant and a dependent vowel marker associated with the consonant, and wherein the first user input causes displaying the combination of the consonant and the dependent vowel marker in the user interface.

29. The system of claim 28, wherein generating the second ordered code point sequence comprises:

identifying a position before a code point representing the consonant in the combination in the first ordered code point sequence; and inserting a code point representing a special character of the Indic language corresponding to the exception input in the identified position.

30. The system of claim 28, wherein generating the second ordered code point sequence comprises:

identifying a position in the first ordered code point sequence of the code point representing the consonant;

replacing the code point representing the consonant with one or more code points representing a first variant of the consonant; and adding one or more code points representing a special character corresponding to the exception input adjacent to the one or more code points representing the first variant and between the code point representing the consonant and the dependent vowel marker.

31. The system of claim 23, wherein the code point of the first ordered code point sequence represents a variant of one Indic language character in the Indic language in a compound formed by combining the variant with a consonant of the Indic language.

32. The system of claim 31, wherein generating the second ordered code point sequence comprises:

identifying a position before a code point representing the variant in the first ordered code point sequence; and inserting a code point representing a special character of the Indic language corresponding to the exception input in the identified position.

33. The system of claim 31, wherein generating the second ordered code point sequence comprises:

identifying a position in the first ordered code point sequence of the code point representing the consonant;

replacing the code point representing the consonant with one or more code points representing a first variant of the consonant; and adding one or more code points representing a special character corresponding to the exception input adjacent to the one or more code points representing the first variant and between the code point representing the variant and the consonant.

34. A computer-implemented method comprising:

receiving, by data processing apparatus, a first sequence including at least one character in a user interface, the first sequence received in response to a first user input, the at least one character encoded by a first ordered code point sequence including a first plurality of code points, wherein each code point in the first ordered code point sequence represents a respective Unicode code point;

receiving, by the data processing apparatus, a second sequence encoding encoded by a second ordered code point sequence including a second plurality of code points after the first sequence, wherein each code point in the second ordered code point sequence represents a respective Unicode code point;

determining, by the data processing apparatus, that the second sequence defines an exception to the first ordered code point sequence by determining a particular sequence of code points including the first ordered code point sequence followed by the second ordered code point sequence does not represent a character to which a combination of the first sequence and the second sequence correspond;

in response to determining that the second sequence defines an exception to the first ordered code point sequence, generating, by the data processing apparatus, a third code point sequence by mapping the first ordered code point sequence and the second ordered code point sequence to the third code point sequence, the third code point sequence comprising the first plurality of code points and the second plurality of code points and comprising the second ordered code point sequence at the beginning of the third code point sequence; and displaying, by the data processing apparatus, an output defined by the third code point sequence in place of the first sequence and the second sequence.

35. The method of claim 34, wherein a sequence in which code points in the third code point sequence are arranged comprises the second ordered code point sequence followed by the first ordered code point sequence.

* * * * *

UNITED STATES PATENT AND TRADEMARK OFFICE
CERTIFICATE OF CORRECTION

PATENT NO. : 8,847,962 B2
APPLICATION NO. : 12/166237
DATED : September 30, 2014
INVENTOR(S) : Raghunath et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1180 days.

Signed and Sealed this
Twenty-second Day of September, 2015

Michelle K. Lee
*Director of the United States Patent and Trademark Office*